(12) United States Patent
Nykanen et al.

(10) Patent No.: US 7,944,947 B2
(45) Date of Patent: May 17, 2011

(54) PROVIDING ADDRESS INFORMATION FOR REACHING A WIRELESS TERMINAL

(75) Inventors: Petri Nykanen, Nokia (FI); Jari Mononen, Ruutana (FI)

(73) Assignee: Nokia Corporation, Espoo (FI)

( * ) Notice: Subject to any disclaimer, the term of this patent is extended or adjusted under 35 U.S.C. 154(b) by 1189 days.

(21) Appl. No.: 10/656,834

(22) Filed: Sep. 5, 2003

(65) Prior Publication Data
US 2005/0054343 A1    Mar. 10, 2005

(51) Int. Cl.
*H04J 3/24* (2006.01)
(52) U.S. Cl. .................. 370/475; 370/352; 709/245
(58) Field of Classification Search .......... 370/349, 370/389–392, 401, 475; 709/245
See application file for complete search history.

(56) References Cited

U.S. PATENT DOCUMENTS

| | | | | |
|---|---|---|---|---|
| 6,243,749 | B1* | 6/2001 | Sitaraman et al. | 709/245 |
| 7,039,721 | B1* | 5/2006 | Wu et al. | 709/245 |
| 2002/0105954 | A1* | 8/2002 | Craig et al. | 370/475 |
| 2002/0116523 | A1 | 8/2002 | Warrier et al. | |
| 2002/0138622 | A1 | 9/2002 | Dorenbosch et al. | |
| 2002/0173310 | A1* | 11/2002 | Ebata et al. | 455/445 |
| 2003/0028671 | A1* | 2/2003 | Mehta et al. | 709/230 |
| 2003/0142642 | A1* | 7/2003 | Agrawal et al. | 370/401 |
| 2006/0146820 | A1* | 7/2006 | Friedman et al. | 370/390 |

FOREIGN PATENT DOCUMENTS

| WO | WO 01/97483 | 12/2001 |
|---|---|---|
| WO | WO/0195592 | 12/2001 |
| WO | WO 02/37876 | 5/2002 |

* cited by examiner

*Primary Examiner* — Ricky Ngo
*Assistant Examiner* — Pao Sinkantarakorn
(74) *Attorney, Agent, or Firm* — Alfred A. Fressola; Ware, Fressola, Van Der Sluys & Adolphson LLP

(57) ABSTRACT

The invention relates to a method of providing address information for reaching a wireless terminal, the wireless terminal being connected to a first wireless communication network, a varying public address being dynamically allocated to the wireless terminal, and the wireless terminal being reachable from outside of the first wireless communication network by means of the varying public address. The method comprises dynamically notifying substantially directly at least one other communicating party of a current public address of the wireless terminal.

19 Claims, 8 Drawing Sheets

US 7,944,947 B2

PROVIDING ADDRESS INFORMATION FOR REACHING A WIRELESS TERMINAL

FIELD OF THE INVENTION

The invention relates to mobile reachability and especially to providing address information for reaching a wireless terminal.

BACKGROUND OF THE INVENTION

Wireless communication networks providing packet data communications, such as GPRS (General Packet Radio Service) or 3G (3rd Generation) networks, can be used for providing Internet Protocol (IP) based services for wireless terminals coupled to such networks.

It is common that a unique public IP address is not permanently allocated to wireless terminals in wireless networks. One reason for this is that available IP addresses (specifically IPv4 addresses) are becoming scarce. A wireless network provider may allocate a private IP address to a wireless terminal for communicating within the wireless network, and use NAT (Network Address Translation) for dynamically allocating a public IP address to the wireless terminal for communicating in other networks. (In IP address space, some addresses are defined as private addresses that can be used by anybody in closed, "private" systems. Private IP addresses cannot be used globally as they are not uniquely routable to one specific physical entity. Whereas, public IP addresses are uniquely allocated to specific physical entities and thus they can be routed globally.)

A NAT device is usually a gateway element connecting a network or a part of a network to another network or to another part of a network. NAT may be implemented in many different ways; the main idea being replacing a private address used behind a NAT device with a public IP address for communicating in other networks and vice versa. That is, in a NAT device a source and/or destination address is changed from a private IP address to a public IP address or vice versa.

NAT may employ for example many-to-one mapping in the translation, meaning that all private IP addresses used behind the NAT device are replaced by the public IP address of the NAT device in the translation. In this way, all data packets originated behind the NAT device appear in other networks like they were originated in the NAT device. The NAT device then keeps track of the data packets returning to the NAT device, translates the public IP address back to the original private IP address, and forwards the data packets to the correct destinations. Usually different port numbers are used for identifying data packets belonging to different parties. In this case, it is not possible to directly contact a wireless terminal behind the NAT device from other networks. Instead, the wireless terminal oust initiate all communication.

One other alternative is to use many-to-many mapping in the translation, meaning that a private IP address used behind the NAT device is replaced by a public IP address taken from a pool of public IP addresses in the translation. Usually the number of public IP addresses in the pool is smaller than the number of private IP addresses in use behind the NAT device, because it is likely that all the devices behind the NAT device do not communicate simultaneously and therefore there is no need to have a public IP address for each of them. Since a public IP address is temporarily allocated specifically to a wireless terminal behind the NAT device, the wireless terminal can be directly contacted from other networks by using this temporarily allocated public IP address. However, one needs to have means to find out, which public IP address has been allocated to the wireless terminal at a given moment.

In addition to NAT, also other methods can be used for dynamically allocating an IP address to a wireless terminal. For example, International application WO 01/97483 A2 describes an alternative method of dynamically allocating an IP address to a mobile terminal.

Many of the IP based services currently available in the wireless domain are based on so-called pull concept, wherein a wireless terminal initiates the communication. If a wireless terminal initiates the IP based communication itself, it is sufficient that a valid public IP address is allocated to the wireless terminal when communication is initiated. In this case there is no need to know the IP address of the wireless terminal beforehand.

However, in some IP based services, such as so-called push-services, IP based multi-player games and IP based chat, the other communicating party initiates the communication. In order for these services to work it is required that IP address of the wireless terminal is known. Let's consider for example a server in the Internet, which is about to provide some IP based, push type of service to a mobile phone in a wireless network, while the public IP address of the mobile phone changes dynamically. Now, it is required that the server has means to find out valid IP address of the mobile phone at a given moment in order to be able to initiate IP based communication and provide the service to the mobile phone. As valid IP address information of wireless terminals is usually not readily available for other communicating parties, there is a need to provide address information for reaching wireless terminals.

A straightforward way to solve the problem discussed above is that a wireless network operator provides a domain name service that announces publicly current IP addresses of the wireless terminals coupled to the respective wireless network. FIG. 1 shows a network diagram illustrating such solution.

Therein a wireless network A 101, wireless network B 110, ISP (Internet Service Provider) network 113 and Intranet network 116 are coupled to the Internet 106 via NAT devices 105, 109 and 112 and via a firewall 115 comprising NAT functionality, respectively. Two wireless devices, a mobile phone 103 and a PDA (Personal Digital Assistant) 102, are coupled to the wireless network A, a mobile phone 111 is coupled to the wireless network B, a server 108 is coupled to the Internet and a PC (Personal Computer) 117 is coupled to the intranet network. Internet, ISP network, intranet network and wireless network A comprise name servers 107, 114, 118 and 104, respectively. A name server is a network element, which maintains address information of various devices by means of predefined host names associated with the respective devices. Name servers may communicate with other name servers in order to obtain address information maintained in some other name server. Also wireless network B may comprise a name server (not shown in FIG. 1).

Let's assume that the mobile phone 103 has a dynamic IP address, which is temporarily allocated to the mobile phone for example by a DHCP (Dynamic Host Configuration Protocol) server (not shown in FIG. 1) or by the NAT device 105 or by some other means. Every time the public IP address of the mobile phone 103 changes the currently valid address is stored into name server 104 in association with a unique host name that has been allocated to the mobile phone. As the wireless network operator controls both the allocation of IP addresses and the name server, it is straight-forward to keep the name server 104 up-to-date.

The name server 104 then announces the currently valid IP address of the mobile phone 103 to other communicating parties by means of the unique host name associated with the mobile phone either directly or via other name server elements. Dashed lines in FIG. 1 illustrate distributing the IP address of the mobile phone 103 to other communicating parties via different name servers. For example, PC 117 obtains the IP address of the mobile phone 103 from the name server 118, which obtains the IP address from the name server 104 via the name server 107, and PDA device 102 obtains the IP address of the mobile phone 103 directly from the name server 104.

This solution does not have large technical problems. However, the problem of this solution is that business-wise wireless network operators are generally not comfortable with sharing reachability information. At least the operators are not willing to provide the reachability information for external parties free of charge, because providing such service may reduce network operators' income as it enables bypassing their proprietary services by IP based services, for example.

Another way to approach the addressability of mobile terminals is to use address conversions of SIP (Session Initiation Protocol), proposed by IETF (Internet Engineering Task Force). In the SIP addressing method, a SIP registration proxy is used for converting different types of information, which specifies the user (such as email address or telephone number of the user), to corresponding terminal IP address. Wireless terminal users register themselves in the SIP registration proxy, so that other wireless terminal users can obtain their IP address from the registration proxy. The use of SIP requires that specific SIP servers are implemented and that client terminals support specific SIP protocol.

Thus, none of the current solutions is optimal, and therefore there is a need for a new, alternative solution for tackling with the mobile reachability problem.

SUMMARY OF THE INVENTION

Now, a new method for providing address information for reaching a wireless terminal has been invented.

A first aspect of the invention is based on an idea of a wireless terminal itself announcing its currently valid IP address to other communicating parties. That is, a wireless terminal having a dynamic IP address announces its currently valid IP address directly to those other communicating parties that have requested to be updated whenever the IP address of the wireless terminal changes. According to an embodiment of the invention the other communicating parties to which the IP address of the invention is given are conditionally chosen according to predefined profile information.

According to the first aspect of the invention, there is provided a method of providing address information for reaching a wireless terminal, said wireless terminal being connected to a first wireless communication network, a varying public address being dynamically allocated to said wireless terminal, and said wireless terminal being reachable from outside of the first wireless communication network by means of said varying public address, wherein the method comprises:

dynamically notifying substantially directly at least one other communicating party of a current public address of the wireless terminal.

The term identification information herein refers to information, which is associated with a wireless terminal and can be used for specifying corresponding wireless terminal. An example of such identification information is for example a predefined host name.

A second aspect of the invention is based on an idea of maintaining an external name server for storing and distributing currently valid IP addresses of wireless terminals. Additionally, such name server is preferably adapted to conditionally give out the currently valid IP address of a given wireless terminal according to conditions given in profile information associated with respective wireless terminal. In this way, the address information for reaching the wireless terminal is conditionally obtainable from the name server.

According to the second aspect of the invention, there is provided a method of providing address information for reaching a wireless terminal, said wireless terminal being coupled to a first wireless communication network, a varying public address being dynamically allocated to said wireless terminal, and said wireless terminal being reachable from outside of the first wireless communication network by means of said varying public address, wherein the method comprises:

dynamically notifying an external name server, to which the wireless terminal has been registered by means of identification information associated with the wireless terminal, of a current public address of the wireless terminal, maintaining said current public address in said external name server in association with said identification information, and conditionally giving out said current public address from said external name server according to conditions given in profile information associated with said identification information, whereby the address information for reaching said wireless terminal is conditionally obtainable from said external name server by means of said identification information.

According to a third aspect of the invention, there is provided a system for providing address information for reaching a wireless terminal, the system comprising a wireless communicating network, a wireless terminal coupled to said wireless communication network, a varying public address being dynamically allocated to said wireless terminal, and said wireless terminal being reachable from outside of said wireless communication network by means of said varying public address, and at least one other communicating party;

said wireless terminal comprising means for dynamically notifying substantially directly said at least one other communicating party of a current public address of the wireless terminal.

According to a fourth aspect of the invention, there is provided a system for providing address information for reaching a wireless terminal, the system comprising a wireless communicating network, a wireless terminal coupled to said wireless communication network, a varying public address being dynamically allocated to said wireless terminal, and said wireless terminal being reachable from outside of said wireless communication network by means of said varying public address, and an external name server;

said wireless terminal being registered to said external name server by means of identification information associated with the wireless terminal, said wireless terminal being configured to dynamically notify said external name server of a current public address of the wireless terminal, said external name server being configured to maintain said current public address in association with said identification information, said external name server being configured to maintain profile information associated with said identification information, and said external name server being configured to conditionally give out said current public address according to conditions given in said profile information, whereby the address information for reaching said wireless terminal is conditionally obtainable from said external name server by means of said identification information.

According to a fifth aspect of the invention, there is provided a name server configured to to maintain a current public address of a wireless terminal in association with identification information associated with the wireless terminal, said public address having been dynamically allocated to said wireless terminal, and said wireless terminal being reachable by means of said public address, to maintain profile information associated with said identification information, and to conditionally give out said current public address according to conditions given in said profile information, whereby the address information for reaching said wireless terminal is conditionally obtainable from said name server by means of said identification information.

According to a sixth aspect of the invention, there is provided a wireless terminal coupled to a wireless communication network, a varying public address being dynamically allocated to said wireless terminal, and said wireless terminal being reachable from outside of said wireless communication network by means of said varying public address, said wireless terminal being configured to dynamically notify substantially directly at least one other communicating party of a current public address of the wireless terminal.

According to a seventh aspect of the invention, there is provided a wireless terminal coupled to a wireless communication network, a varying public address being dynamically allocated to said wireless terminal, said wireless terminal being reachable from outside of said wireless communication network by means of said varying public address, said wireless terminal being registered to an external name server by means of identification information associated with the wireless terminal, and said wireless terminal being configured to dynamically notify said external name server of a current public address of the wireless terminal, and to provide profile information to said external name server, said external name server being configured to conditionally give out said current public address of the wireless terminal according to conditions given in said profile information, whereby the address information for reaching said wireless terminal is conditionally obtainable from said external name server by means of said identification information.

The wireless terminal according to the invention may be any suitable device having wireless data packet communication capabilities. Examples of such devices are mobile phones, PDA devices, laptop computers and other data processing devices having or being connected to a wireless communication module.

According to an eighth aspect of the invention, there is provided a communicating device configured to receive address information for reaching another communicating party substantially directly from said another communicating party.

The communicating device according to the invention may be any suitable device having either wireless or fixed data packet communication capabilities. Examples of such devices are general-purpose computers, servers, laptop computers, mobile phones and PDA devices.

According to a ninth aspect of the invention, there is provided a computer program executable in a name server, said computer program providing routine of maintaining in said name server a current public address of a wireless terminal in association with identification information associated with the wireless terminal, said public address having been dynamically allocated to said wireless terminal, and said wireless terminal being reachable by means of said public address, maintaining in said name server profile information associated with said identification information, and conditionally giving out said current public address according to conditions given in said profile information, whereby the address information for reaching said wireless terminal is conditionally obtainable from said name server by means of said identification information.

According to a tenth aspect of the invention, there is provided a computer program executable in a wireless terminal coupled to a wireless communication network, said wireless terminal having a varying public address dynamically allocated to it, and said wireless terminal being reachable from outside of said wireless communication network by means of said varying public address, said computer program providing routine of dynamically notifying substantially directly at least one other communicating party of a current public address of the wireless terminal.

According to an eleventh aspect of the invention, there is provided a computer program executable in a wireless terminal coupled to a wireless communication network, said wireless terminal having a varying public address dynamically allocated to it, said wireless terminal being reachable from outside of said wireless communication network by means of said varying public address, and said wireless terminal being registered to an external name server by means of identification information associated with the wireless terminal, said computer program providing routine of dynamically notifying said external name server of a current public address of the wireless terminal, and providing profile information to said external name server, said external name server being configured to conditionally give out said current public address of the wireless terminal according to conditions given in said profile information, whereby the address information for reaching said wireless terminal is conditionally obtainable from said external name server by means of said identification information.

According to a twelfth aspect of the invention, there is provided a computer program executable in a communicating device, said computer program providing routine of receiving address information for reaching another communicating party substantially directly from said another communicating party.

Dependent claims contain some embodiments of the invention. The subject matter contained in dependent claims relating to a particular aspect of the invention is also applicable to other aspects of the invention.

A benefit of the invention is that it is based on standard IP technology and thus it supports IP based protocols and applications built on top of IP protocol without further modifications to the systems. There is no need to use specific initiation protocols, such as SIP, and have related functionality supported in the networks. Nevertheless, the use of the invention in connection with SIP is not restricted.

A benefit of certain embodiments of the invention is that a user of a wireless terminal can control to which parties its address information shall be available.

BRIEF DESCRIPTION OF THE DRAWINGS

Embodiments of the invention will now be described by way of example with reference to the accompanying drawings in which.

DETAILED DESCRIPTION

Figure 1:
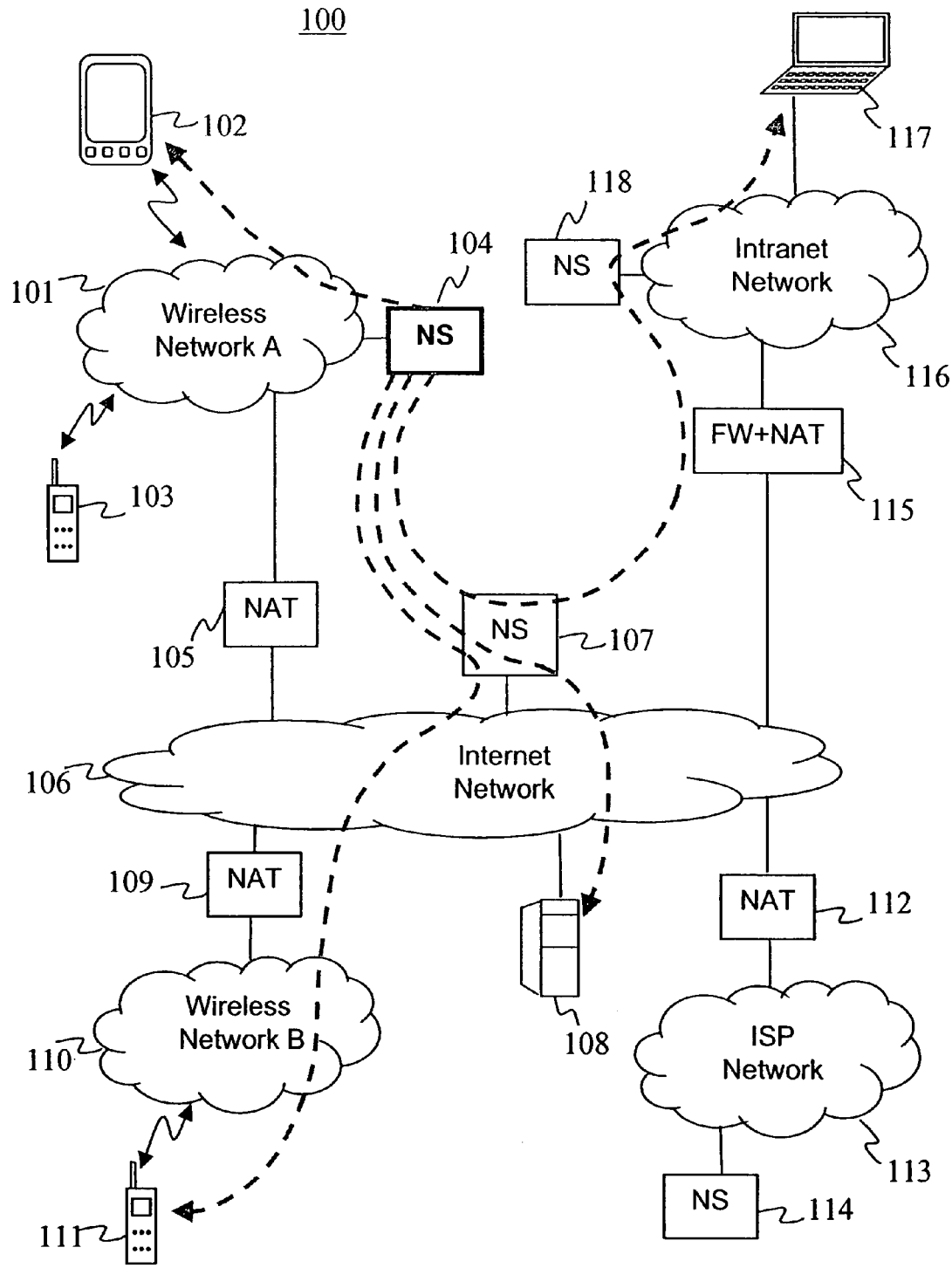
FIG. 1 is a network diagram of a communicating system according to prior art.

FIG. 1 has been discussed above in connection with prior art.

Figure 2:
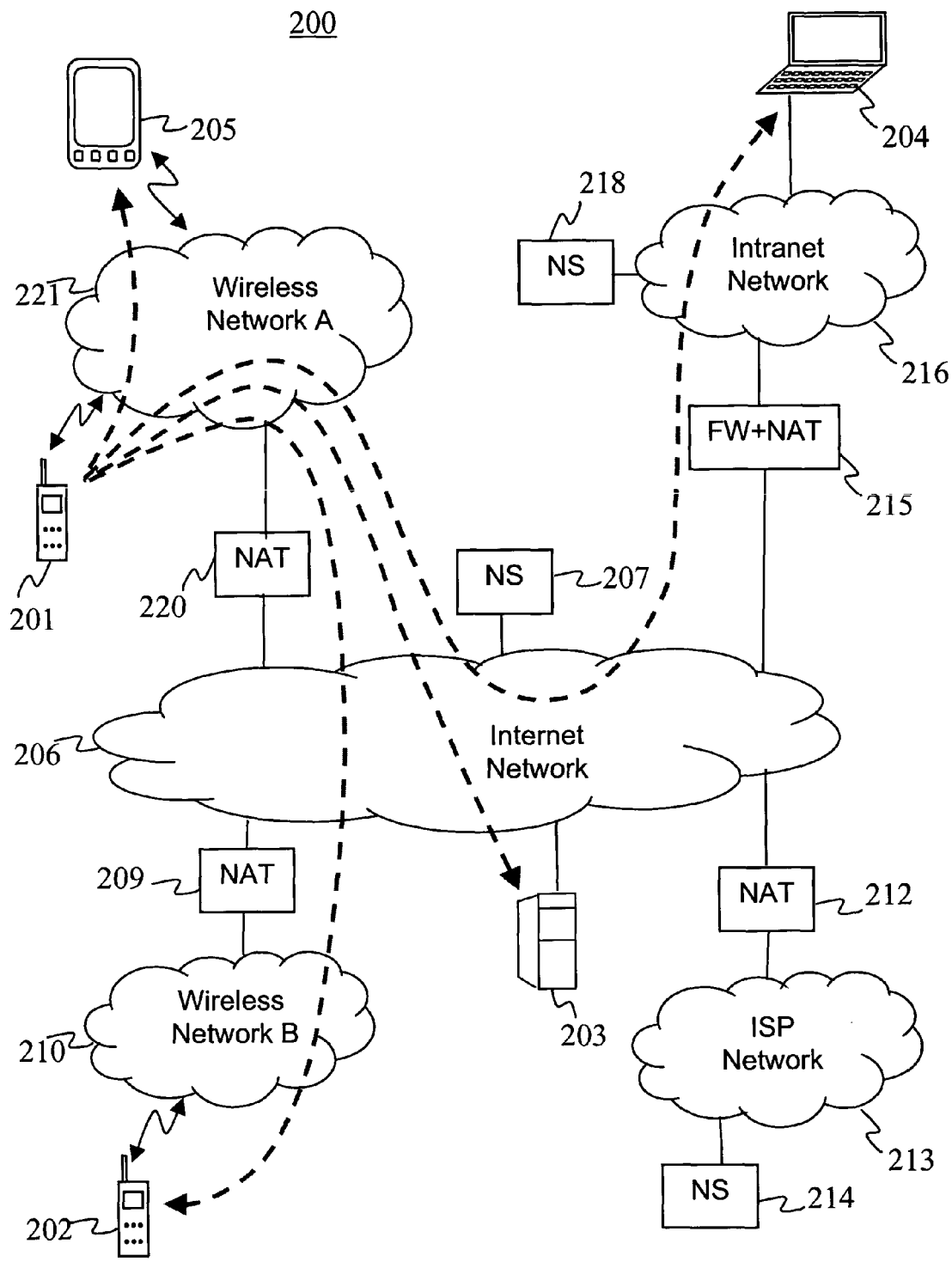
FIG. 2 is a network diagram of a communicating system according to an embodiment of the invention.
Figure 3:
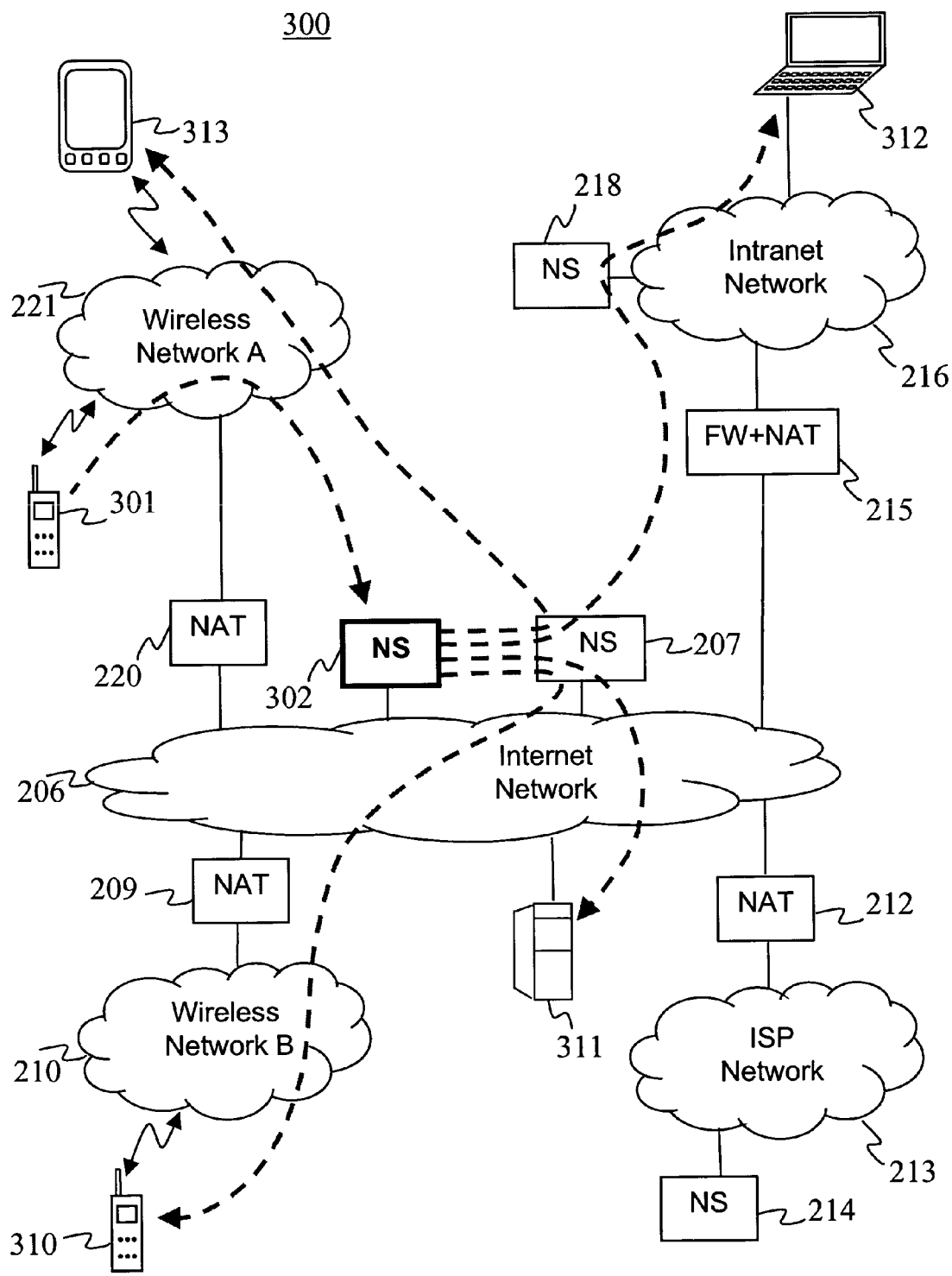
FIG. 3 is a network diagram of a communicating system according to another embodiment of the invention.

FIGS. 2 and 3 are network diagrams of communicating systems according to certain embodiments of the invention. In the following, equal reference numbering is used for equal elements in FIGS. 2 and 3.

In FIG. 2, a wireless network A 221, wireless network B 210, ISP network 213 and Intranet network 216 are coupled to the Internet 206 via NAT devices 220, 209 and 212 and a firewall 215 comprising NAT functionality, respectively. Two wireless devices, a mobile phone 201 and a PDA (Personal Digital Assistant) 205, are coupled to the wireless network A, a mobile phone 202 is coupled to the wireless network B, a server 203 is coupled to the Internet and a PC (Personal Computer) 204 is coupled to the intranet network.

Internet, ISP network and intranet network comprise name servers 207, 214 and 218, respectively. A name server is a network element, which maintains address information of various devices by means of predefined host names associated with the respective devices. Name servers may communicate with other name servers in order to obtain address information maintained in some other name server. Also wireless networks A and B may comprise name servers (not shown in FIG. 2).

According to an embodiment of the invention, the mobile phone 201 announces its currently valid IP address directly to other communicating parties, such as PDA 205, mobile phone 202, server 203 and PC 204. Dashed lines in FIG. 2 illustrate, how the IP address of the mobile phone is sent to other communicating parties.

Announcing the currently valid IP address may be implemented so that the mobile phone 201 sends substantially periodically an address update request to other communicating parties and that the other communicating parties extract the source address of the address update request they receive and use that source address as the currently valid public IP address of the mobile phone 201. The notification can be done in this way, because the source address the other communicating party sees is effectively a public IP address with which the mobile phone can be reached. Preferably, the address update request comprises information that identifies the mobile phone 201 so that other communicating parties know whose address information they received.

The frequency of sending the address update requests depends on the network environment. If for example a NAT device has been configured to reserve a public IP address for one communicating entity for X minutes/hours after active connections of the respective communicating entity have been terminated, sending an address update request every X minutes/hours may be used. Also any other suitable values may be used.

In many mobile network implementations, the IP address of a mobile device is configured to be changed as geographical location of the mobile device changes, while the same IP address may be used continuously for a longer period of time, if the mobile device is stationary. Depending on the network configuration of the corresponding mobile network provider the IP address may be changed more or less often. In this kind of environment, a suitable frequency of sending the address update requests may be for example one day.

It must be noted that the link between the geographical location of a wireless terminal and its IP address may cause an additional reason for using NAT on the edge of a mobile communication network. That is, if there is a need to prevent revealing the geographical location of a wireless terminal by means of its IP address, the IP address of the wireless terminal inside the mobile communication network needs to be hidden by means of NAT.

As an alternative to sending the address update requests, there may be a "daemon" software running in the mobile phone 201, which continuously monitors the public IP address that is allocated to the mobile phone and automatically sends the public IP address to other communicating parties, when the public IP address changes. Also in this case the public IP address is preferably accompanied with information identifying the mobile phone 201 so that other communicating parties know whose address information they received.

Naturally, the mobile phone 201 needs to know the IP addresses of the other communicating parties in order to be able to announce its own IP address directly to the other communicating parties. The other communicating party may have static IP address or its IP address may be otherwise publicly available. In that case knowing the IP address of the other communicating party is clearly not a problem. However, also the other communicating party may have dynamically changing IP address, which is not publicly available. In that case some other than IP based communication may be used for initially providing the IP address of the other communicating party to the mobile phone 201. For example SMS (Short Messaging Service) message or verbal communication either in person or in a telephone conversation can be used. Clearly, any other suitable method can be used, as well.

Preferably, there is a "listener daemon" software running in the other communicating parties, such as PDA 205, mobile phone 202, server 203 and PC 204, which listener daemon is adapted to receive and store currently valid IP address of the mobile phone 201 whenever it is sent. For example, HTTP (Hypertext Transfer Protocol) or HTTPS (HTTP Secure) interface and selected signing, authentication and user identification methods, combined with suitable cookie exchanges and/or the use of previously valid IP address of the mobile phone, can be used in communication between the mobile phone 201 and other communicating parties 205, 202, 203 and 204. These methods are well known to a person skilled in the art, and thus, they are not addressed herein any further.

The communicating parties, which are informed of the address information, may be chosen for example on the basis of a predefined list. Preferably, other communicating parties may request to be added to the list. Adding a communicating party to the list may be executed automatically when subscribing an IP based service and/or the user of the mobile phone may manually add communicating parties to the list.

In addition, the user of the mobile phone 201 may have a further possibility to control, which other communicating parties are informed of its public IP address. The user may further control the sending of the address information by predefined profile information. For example, during working hours the user may select a "busy" profile resulting in denying the sending of the address information to a news push server in the Internet. Whereas, "free time" profile would allow sending the address information to the news push server and deny sending the address information to some business contact. In this way the users can select which type of communication they are willing to receive at a given moment. Naturally changing the profile from "free time" to "busy" does not instantaneously prevent the news push server from contacting the mobile phone, but as soon as the public IP address of the mobile phone changes, the news push server loses its contact to the mobile phone.

It must be noted that in addition to the denial of addressing information described above more advanced firewalls or other information security measures can be used for securing the mobile phone 201. Typically the denial of addressing information should be regarded as a first line of defence, while more advanced security measures, such as firewalls, may be used for actually blocking unwanted connection attempts.

In FIG. 3 a wireless network A 221, wireless network B 210, ISP network 213 and Intranet network 216 are coupled to the Internet 206 via NAT devices 220, 209 and 212 and a firewall 215 comprising NAT functionality, respectively. Two wireless devices, a mobile phone 301 and a PDA (Personal Digital Assistant) 313, are coupled to the wireless network A, a mobile phone 310 is coupled to the wireless network B, a server 311 is coupled to the Internet and a PC (Personal Computer) 312 is coupled to the intranet network.

Internet, ISP network and intranet network comprise name servers 207, 214 and 218, respectively. Also wireless networks A and B may comprise name servers (not shown in FIG. 3). The Internet comprises additionally another name server 302, so called external name server.

According to an embodiment of the invention, the mobile phone 301 sends its currently valid IP address to the external name server 302 in the Internet whenever the public IP address of the mobile phone 301 changes. The IP address is typically sent as combination of the IP address an host name defined for the mobile phone. Additionally, the combination may comprise suitable authorization credentials.

The currently valid IP address of the mobile phone 301 may be sent to the external name server 302 by means of substantially periodic address update requests, whereby the external name server extracts the source address of the address update request it receives and uses that source address as the currently valid public IP address of the mobile phone 301. Alternatively, there may be a "daemon" software running in the mobile phone 301, which continuously monitors the public IP address that is allocated to the mobile phone and automatically sends the public IP address to the external name server, when the public IP address changes.

The external name server maintains the currently valid IP address of the mobile phone 301 in a table or some other suitable data structure and provides the IP address to other communicating parties, such as PDA 313, mobile phone 310, server 311 and PC 312, when needed either directly or via other name servers. Dashed lines in FIG. 3 illustrate, how the IP address of the mobile phone is distributed in the system.

In addition to the address information, the external name server 302 preferably maintains profile information associated with the respective mobile phone. Then, the communicating parties, to which the IP address of the mobile phone 301 is given, are conditionally chosen on the basis of the conditions given in the respective profile information. The profile information may be provided to the external name server beforehand or it may be defined in the mobile phone 301 and sent to the external name server along with the IP address of the mobile phone. Preferably a user may modify the profile information via a user interface of the mobile phone 301. The profile information may be sent to the external name server every time a new address or an address update request is sent or only when the profile has been modified. Furthermore, the profile information may be sent on its own, without the address information, if the profile information has been modified but the IP address of the mobile phone has not been changed.

The profile information may indicate that the IP address of the mobile phone 301 shall not be given to any other communicating party or it may indicate a set of addresses to which the IP address of the mobile phone 301 may (or may not) be given during working hours, for example.

It must be noted that the aspects related to firewalls and other security measures between different networks should be taken into account. For example in FIG. 2, the firewall 215 may be configured so that it does not allow sending address information directly to the PC 204. In that case, a combination of the embodiments illustrated in FIGS. 2 and 3 may be used. In such combination, the mobile phone 201 would be adapted to announce its IP address both directly to other communicating parties and to an external name server. Then PC 204 would obtain the address information from the external name server, while some other communicating parties receive the address information directly from the mobile phone 201.

Furthermore, there might be some security related issues that have to be considered in getting address information sent from the mobile phone 201 or 301 to other networks. As most firewalls and other security measures allow HTTP traffic to traverse them (more or less) freely, an HTTP connection to port 80 can be used for sending the address information. (In general, IP based communication is addressed to a certain IP address and to a certain port. Port 80 is commonly used in connection with HTTP traffic.) In this way sending the address information does not differ in any way from "normal" HTTP traffic from the firewall point of view.

Figure 4:
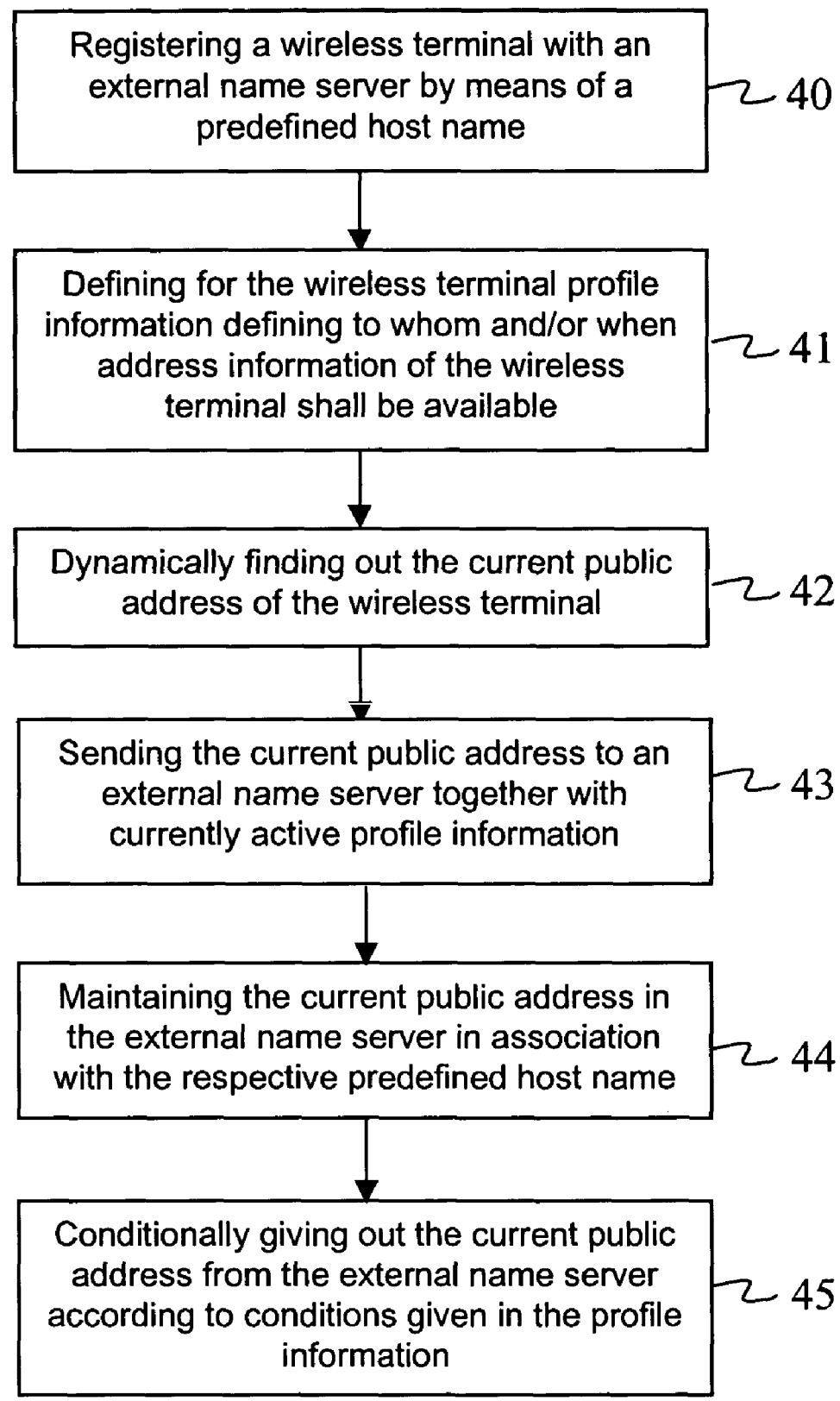
FIGS. 4-6 are flow diagrams illustrating certain embodiments of the invention.
Figure 5A:
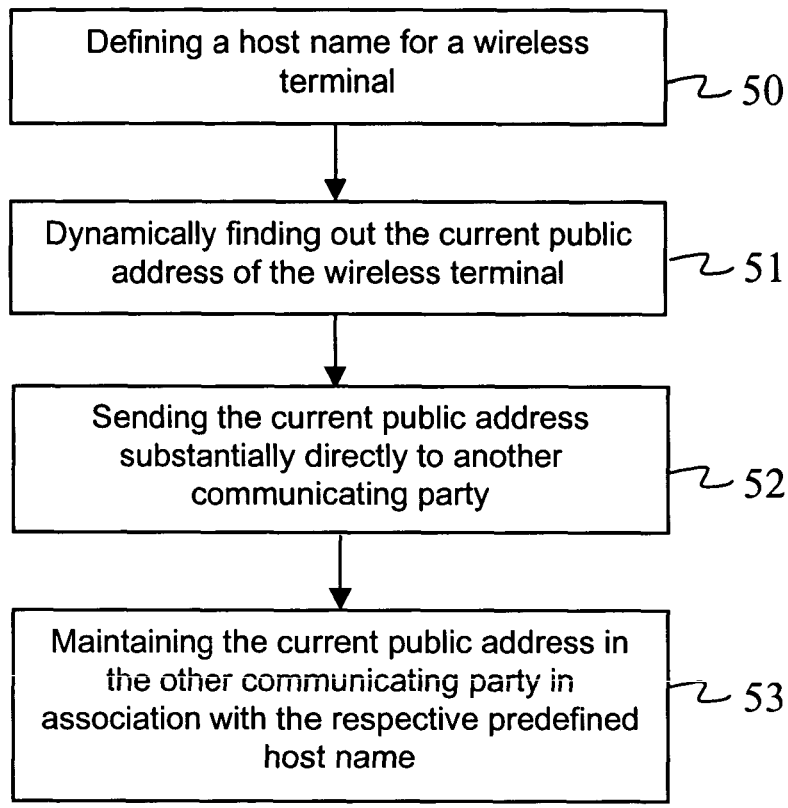
Figure 5B:
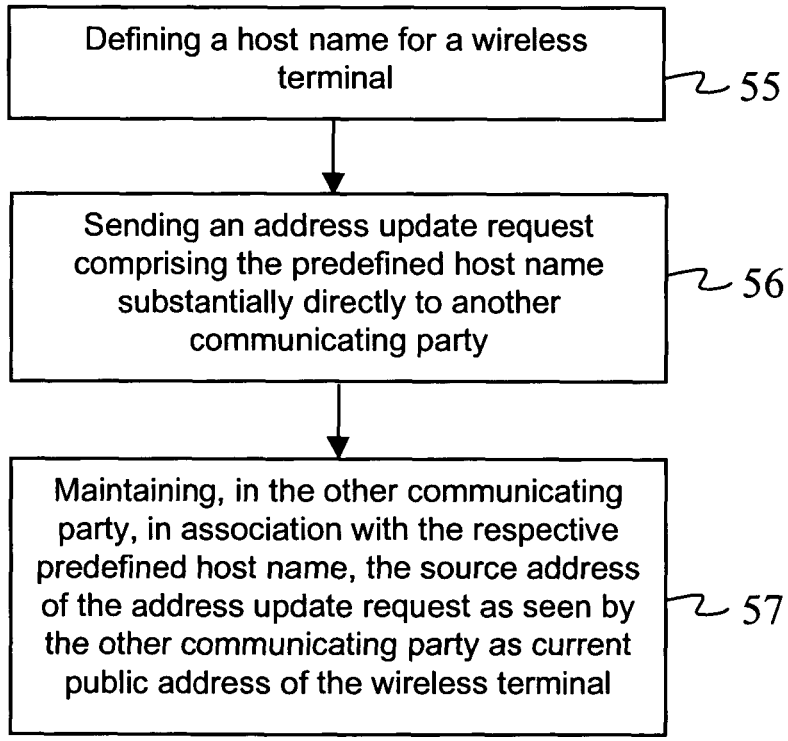
Figure 6:
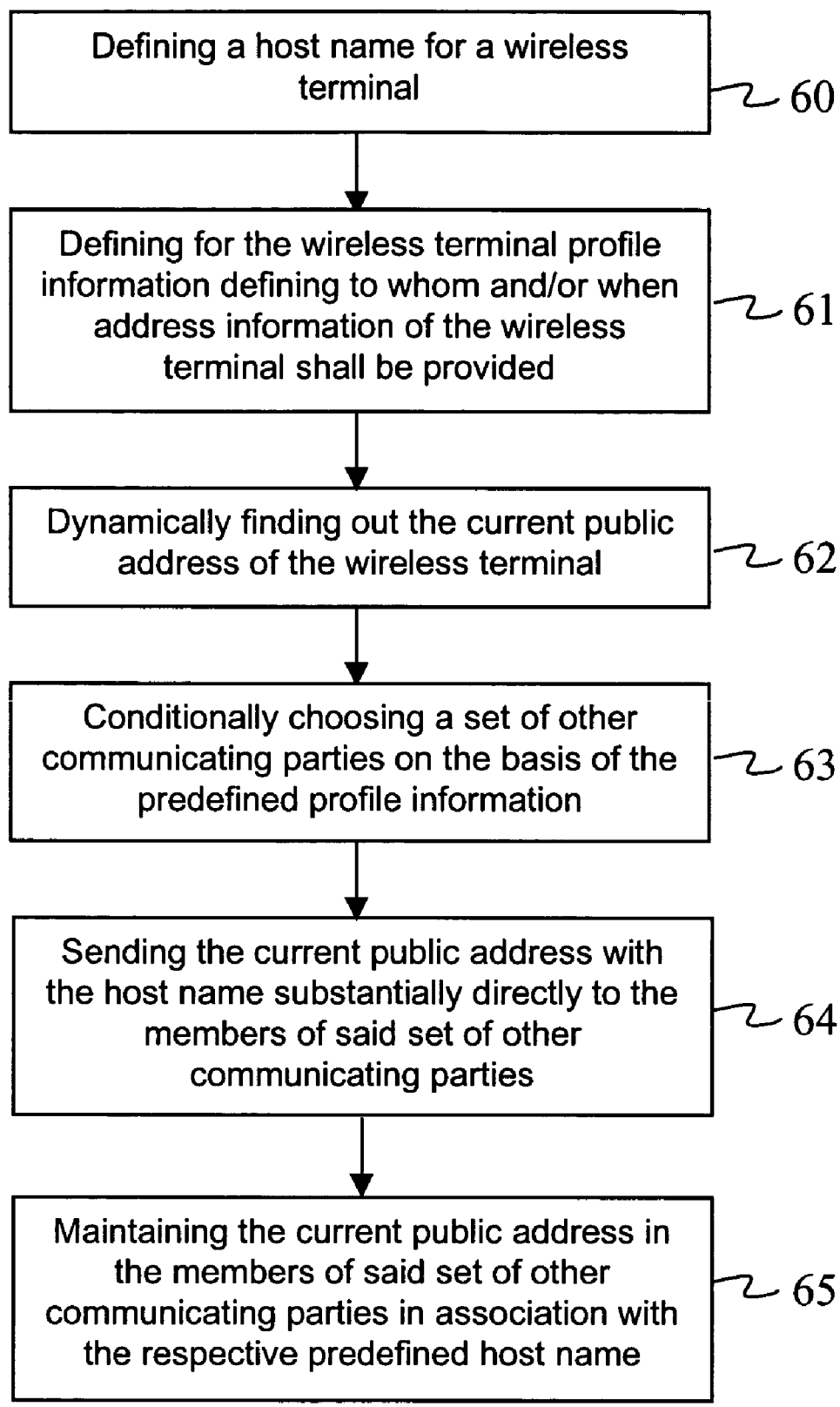

FIGS. 4-6 are flow diagrams illustrating certain embodiments of the invention. The flow diagram of FIG. 4 illustrates a method suitable for the system of FIG. 3 and the flow diagrams of FIGS. 5A, 5B and 6 illustrate methods suitable for the system of FIG. 2.

In FIG. 4, a wireless terminal, such as the mobile phone 301 of FIG. 3, is registered in step 40 with an external name server by means of a predefined host name. The term external name server herein refers to a name server not located in the same network with the wireless terminal. Typically such external name server is maintained by an independent third party providing its services to anybody, irrespective of their network service providers, for example. The predefined host name may be freely chosen by the user of the wireless terminal or it may be formulated at least partially by the external name server that is used. The host name may be for example phone number of the user or a completely fictitious name. Also some other identification information can be used instead of the host name.

In step 41, profile information, which defines for example to whom and/or when address information of the wireless terminal shall be available, is defined for the wireless terminal. Defining herein refers to either activating a predefined profile or to actual creation of a profile. Then, current public address of the wireless terminal is found out in step 42. This step may comprise polling the current public address continuously and/or querying the current public address from some external service, which is capable of seeing the public address that has been allocated to the terminal at a given moment. Such services are readily available and thus they are not discussed any further herein.

In step 43, the current public address is sent to an external name server together with currently active profile information. Also the predefined host name is included while sending the current public address for enabling identification of the corresponding wireless terminal in the external name server. It must be noted that it is not necessary to send profile information each time the current public address is sent. Instead, the profile may be sent only when it has been changed. If necessary, the profile information may be sent even on its own, if the profile has been modified but the current public address has not changed. In any case the predefined host name is a key to identifying the wireless terminal in the external name server, and thus the host name is sent every time something is sent to the external name server.

The current public address is then maintained in step 44 in said external name server in association with respective predefined host name. In step 45, the current public address of the wireless terminal is conditionally given out from the external name server according to conditions given in the respective profile information. Thereby the address information for reaching the wireless terminal is conditionally obtainable from said external name server by means of said predefined host name.

In FIG. 5A, a host name is defined for a wireless terminal, such as the mobile phone 201 of FIG. 2, in step 50. The host name may be chosen somewhat freely as long as the host name is uniquely identifiable by the other communicating parties to which the user of the wireless terminal is willing to provide its address information. Also some other identification information instead of the host name can be used. Current public address of the wireless terminal is found out in step 51. Equally to step 42 of FIG. 4, step 51 may comprise polling the current public address continuously and/or querying the current public address from some external service, which is capable of seeing the public address that has been allocated to the terminal at a given moment.

Then, the current public address is sent substantially directly to another communicating party in step 52. It must be noted that sending the current public address is not in any way restricted to only one other communicating party. Instead, the current public address may be sent to as many other communicating parties as necessary. Equally to step 43 of FIG. 4, the current public address is accompanied with the host name defined for the wireless terminal also in step 52 so that the other communicating party may identify the wireless terminal.

The other communicating device may be any communicating device, which may need to communicate with the wireless terminal, either fixed or wireless. Such device may be for example another wireless terminal located in the same or different wireless network with the wireless terminal sending the address information, or a server or a general-purpose computer located in the Internet or in some private network. Sending the address information substantially directly to the other communicating party refers to an arrangement, wherein the address information is destined directly to the other communicating party and a middle storage, such as a name server, is not used for maintaining the address information. Naturally, the address information may be temporarily stored in some network element before reaching the other communicating party.

In step 53, the current public address of the wireless terminal is maintained in the other communicating party in association with the respective host name, whereby the address information for reaching the wireless terminal is readily available in the other communicating party by means of the host name for future use.

In FIG. 5B, a host name is defined for a wireless terminal, such as the mobile phone 201 of FIG. 2, in step 55. This is done in the same way as in step 50 of FIG. 5A. Then, an address update request comprising the predefined host name is sent substantially directly to another communicating party in step 56. Naturally, an address update request may be sent to more than one other communicating party, if necessary. The host name is included in the payload of the address update request so that the other communicating party is able to identify the wireless terminal. Also in this embodiment, the other communicating device may be any communicating device, which may need to communicate with the wireless terminal, either fixed or wireless.

In step 57 the source address of the address update request as seen by the other communicating party is maintained in the other communicating party as current public address of the wireless terminal. As explained above in connection with FIG. 2, the source address the other communicating party sees in the address update request is effectively a public IP address with which the wireless terminal can be reached. The address may be stored for example in a table of addresses. Equally to step 53 of FIG. 5A, the address is stored in association with the respective predefined host name. In this way, the address information for reaching the wireless terminal is readily available in the other communicating party by means of the host name for future use.

If the other communicating party in the examples above is also a wireless terminal and both terminals are off line for a long time, they may both lose each other's valid IP addresses. This problem may be solved for example manually, by using some other than IP based communication for sending IP address of one party. For example SMS (Short Messaging Service) message or verbal communication either in person or in a telephone conversation can be used. Alternatively, a combination of the methods described for example in connection with FIGS. 4 and 5A or 5B may be used. In such combination, a wireless terminal would announce its IP address both directly to other communicating parties and to an external name server. Then, in case two communicating parties would lose each other's valid IP addresses, valid address information would still be obtainable from the external name server.

In FIG. 6, equally to step 50 of FIG. 5A, a host name (or some other identification information) is defined for a wireless terminal in step 60. In step 61, equally to step 41 of FIG. 4, profile information, which defines for example to whom and/or when address information of the wireless terminal shall be provided, is defined for the wireless terminal. Then, current public address of the wireless terminal is found out in step 62.

In step 63, a set of other communicating parties is chosen on the basis of the profile information defined for the wireless terminal.

Then, the current public address and the host name of the wireless terminal are sent substantially directly to members of said set of other communicating parties in step 64. In step 65, the current public address of the wireless terminal is maintained in the members of the other communicating party in association with the respective host name, whereby they have the address information for reaching the wireless terminal readily available by means of the host name for future use.

Figure 7:
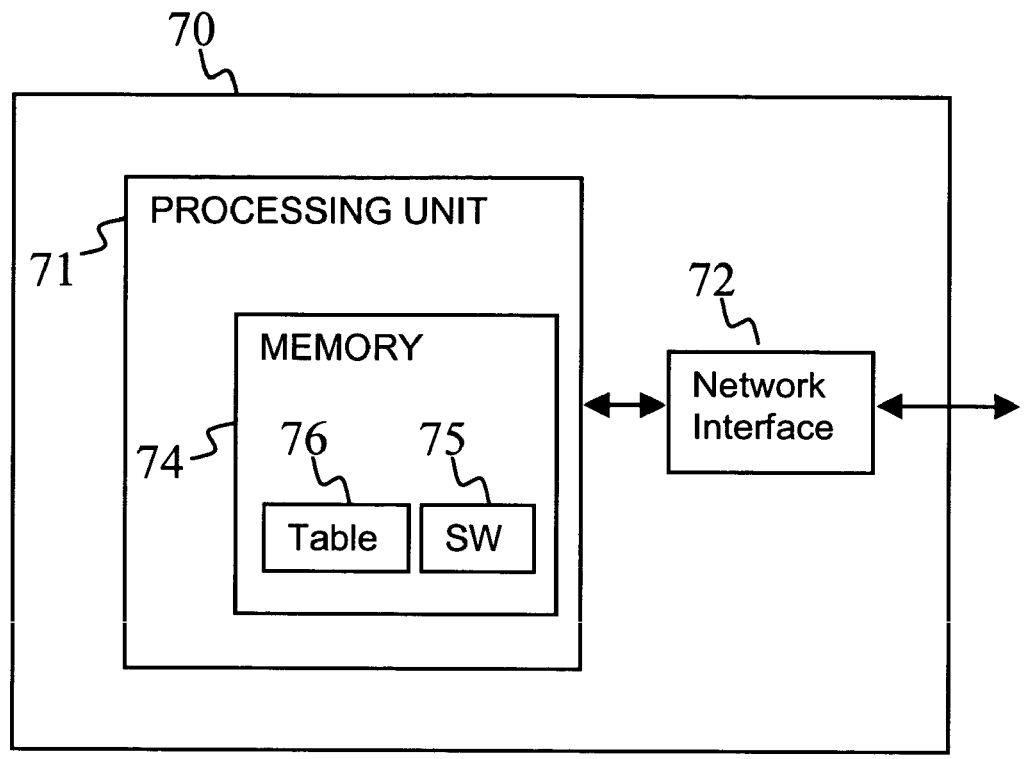
FIG. 7 illustrates a name server according to an embodiment of the invention.

FIG. 7 illustrates a name server 70 according to an embodiment of the invention.

The name server 70 comprises a processing unit 71 and a network interface module 72 coupled to the processing unit 71. The processing unit 71 comprises a processor (not shown), a memory 74, and computer software 75 executable in the processor of the processing unit 71, stored in the memory 74. The processor controls, in accordance with the software 75, the operation of the name server 70 to receive currently valid public IP address of a wireless terminal substantially directly from the respective terminal, and to maintain the current public address of the wireless terminal in a table 76 in memory 74 in association with a predefined host name of the respective wireless terminal. The currently valid public IP address may be sent to the name server as payload of a message or the name server may be configured to use a source address of a message, such as an address update request, received from the wireless terminal as the currently valid public IP address of the wireless terminal. The processor also controls the name server 70 to receive profile information associated with a wireless terminal and to conditionally give out current public address of a wireless terminal according to conditions given in profile information associated with respective wireless terminal.

It must be noted that in the example above, the data structure that is used for storing address information does not need to be a table, but also any other suitable data structure, such as a linked list or a vector, may be used.

Figure 8:
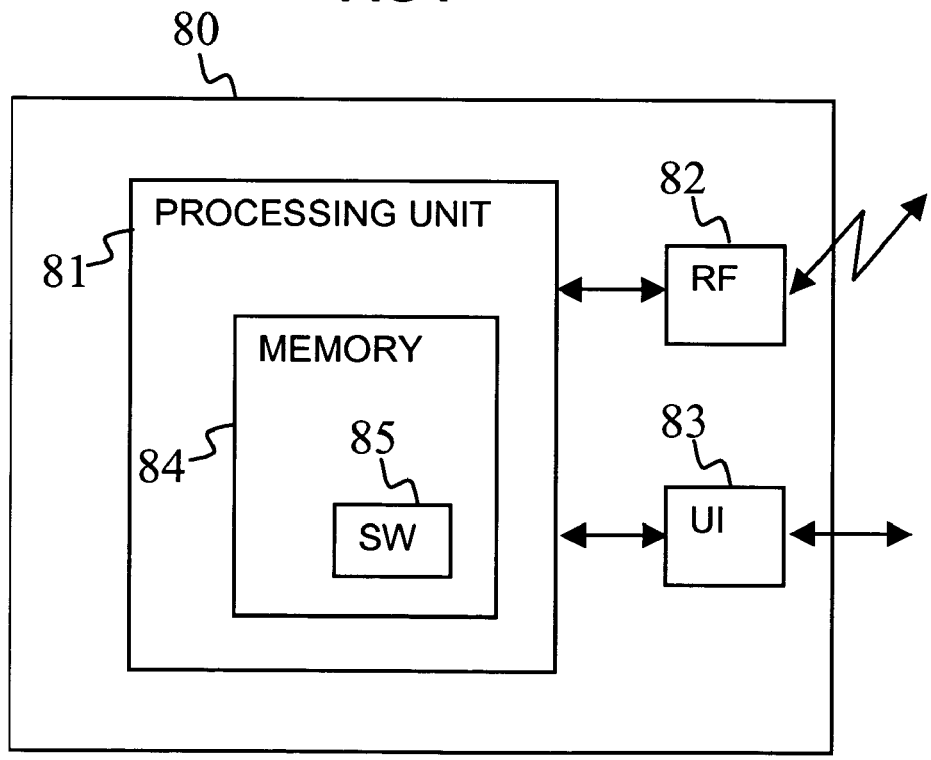
FIG. 8 illustrates a wireless terminal according to an embodiment of the invention.

FIG. 8 illustrates a wireless terminal 80 according to an embodiment of the invention.

The wireless terminal 80 comprises a processing unit 81, a radio frequency part 82, and a user interface 83. The radio frequency part 82 and the user interface 83 are coupled to the processing unit 81. The user interface 83 typically comprises a display, a speaker and a keyboard (not shown) with the aid of which a user can use the wireless terminal 80.

The processing unit 81 comprises a processor (not shown), a memory 84 and computer software 85 executable in the processor of the processing unit 81 stored in the memory 84. The processor controls, in accordance with the software 85, the operation of the wireless terminal 80 to dynamically notify an external entity of currently valid public IP address of the wireless terminal for enabling said external entity or some other external entity to reach the wireless terminal 80. The external entity in this embodiment may be for example an external name server or another communicating party.

The processor may also control the wireless terminal 80 to choose conditionally which other communicating parties are directly notified of the IP address or to which other communicating parties the IP address shall be distributed from an external entity.

Figure 9:
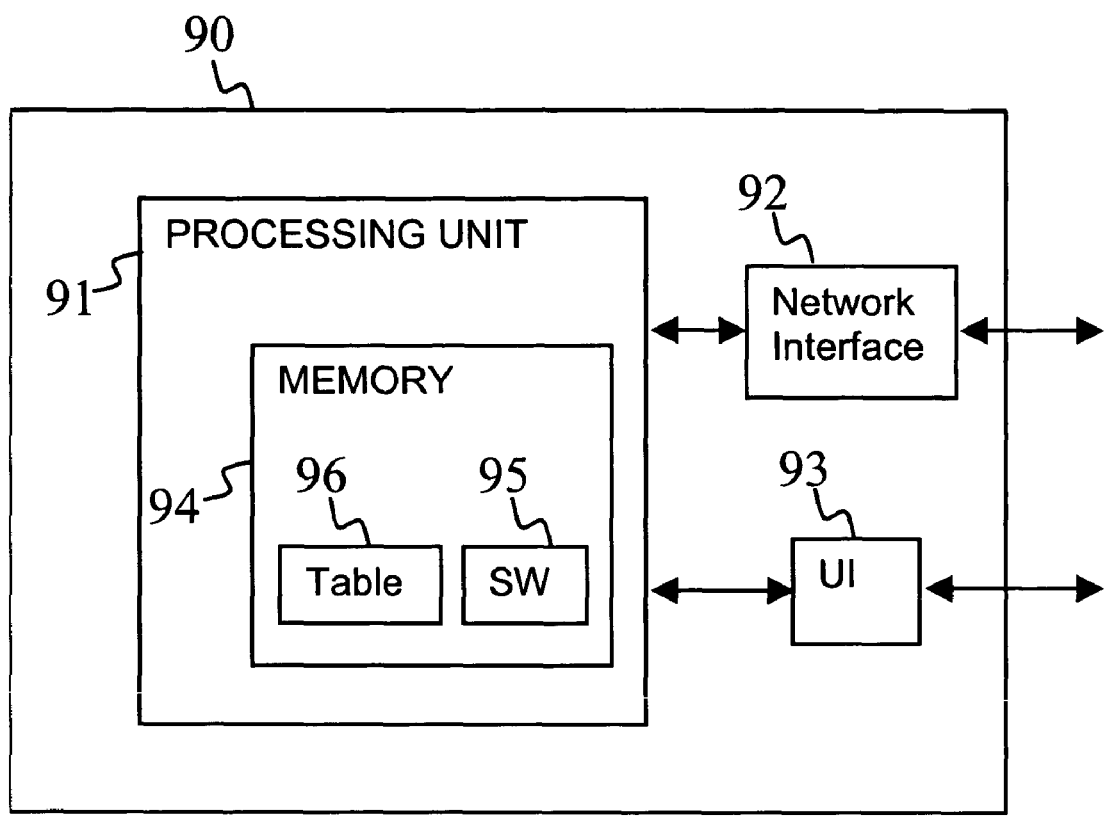
FIG. 9 illustrates a communicating device according to an embodiment of the invention.

FIG. 9 illustrates a communicating device 90 according to an embodiment of the invention. In this embodiment, the communicating device 90 is a fixed terminal. However, the communicating device may, alternatively, be a wireless terminal.

The communicating device 90 comprises a processing unit 91, a network interface module 92, and a user interface 93. The network interface module 92 and the user interface 93 are coupled to the processing unit 91. The user interface 93 typically comprises a display and a keyboard (not shown) with the aid of which a user can use the communicating device 90.

The processing unit 91 comprises a processor (not shown), a memory 94, and computer software 95 executable in the processor of the processing unit 91 stored in the memory 94. The processor controls, in accordance with the software 95, the operation of the communicating device 90 to receive currently valid public IP address of a wireless terminal substantially directly from the respective terminal and to store the address received in a table 96 in the memory 94. The currently valid public IP address may be sent to the communicating device as payload of a message or the communicating device may be configured to use a source address of a message, such as an address update request, received from the wireless terminal as the currently valid public IP address of the wireless terminal. The processor also controls the communicating device to use the address information stored in the table 96 for reaching the wireless terminals, for which an address has been stored in the table.

It must be noted that in the example above, the data structure that is used for storing address information does not need to be a table, but also any other suitable data structure, such as a linked list or a vector, may be used.

Particular implementations and embodiments of the invention have been described. It is clear to a person skilled in the art that the invention is not restricted to details of the embodiments presented above, but that it can be implemented in other embodiments using equivalent means without deviating from the characteristics of the invention. For example, the invention is not restricted to any specific technology of dynamically allocating a public address to a wireless terminal. Rather, the invention can be used in connection with any suitable method. Also any suitable method can be used for finding out currently valid public address of a wireless terminal. The scope of the invention is only restricted by the attached patent claims.

The invention claimed is:

1. A method of providing address information for reaching a wireless terminal, comprising:
    dynamically notifying substantially directly at least one other communicating party of a current public address of said wireless terminal, the at least one other communicating party being an originating party of communication between said wireless terminal and the at least one other communicating party;
    said wireless terminal being connected to a first wireless communication network, said wireless terminal having a private address in the first wireless communication network and a dynamically allocated varying public address, and said wireless terminal being reachable from outside of the first wireless communication network by use of said varying public address,
    wherein said dynamically notifying further comprises directly identifying said wireless terminal to said at least one other communicating party so that said at least one other communicating party knows the current public address it has been notified of is the current public address of said wireless terminal.

2. The method of claim 1, wherein said notifying comprises dynamically sending an address update request substantially directly to said at least one other communicating party, the address update request comprising a source address and a destination address.

3. The method of claim 2, wherein said sending an address update request is repeated periodically.

4. The method of claim 1, wherein said notifying comprises dynamically finding out a public address allocated to the wireless terminal at a given moment for obtaining said current public address of the wireless terminal, and
    sending said current public address of the wireless terminal substantially directly to said at least one other communicating party.

5. The method of claim 4, wherein said sending is conducted, if said current public address has changed after the previous sending of the current public address.

6. The method of claim 4, wherein finding out said current public address comprises
querying the public address of the wireless terminal from an external entity capable of seeing the public address of the wireless terminal.

7. The method of claim 4, wherein finding out said current public address comprises
polling substantially continuously said current public address.

8. The method of claim 1, wherein the method further comprises
choosing conditionally, which other communicating parties are notified of said current public address.

9. The method of claim 8, wherein said choosing is conducted on the basis of predefined profile information defining to whom said current public address shall be available.

10. The method of claim 1, wherein the method further comprises
maintaining said current public address in said at least one other communicating party in association with identification information associated with the wireless terminal, so that the address information for reaching said wireless terminal is readily available in said at least one other communicating party by means of said identification information for future use.

11. The method of claim 10, wherein said identification information is a predefined host name.

12. The method of claim 1, wherein said at least one other communicating party is one of the following: a general-purpose computer, a server and another wireless terminal, such as a mobile phone, a Personal Digital Assistant device or a laptop computer with wireless communicating capability.

13. A system for providing address information for reaching a wireless terminal, the system comprising:
a wireless communication network,
a wireless terminal coupled to said wireless communication network, said wireless terminal having a private address in the wireless communication network and being configured to have a dynamically allocated varying public address, and said wireless terminal being configured to be reachable from outside of said wireless communication network by use of said varying public address, and
at least one other communicating party, the at least one other communicating party being an originating party of communication between said wireless terminal and the at least one other communicating party;
said wireless terminal configured to dynamically notify substantially directly said at least one other communicating party of a current public address of the wireless terminal and to directly identify said wireless terminal to said at least one other communicating party so that said at least one other communicating party knows the current public address it has been notified of is the current public address of said wireless terminal.

14. A wireless terminal coupled to a wireless communication network, comprising:
a processor and associated memory configured:
to have dynamically allocated varying public address, to be reachable from outside of said wireless communication network by use of said varying public address, and
to dynamically notify substantially directly at least one other communicating party of a current public address of the wireless terminal, the at least one other communicating party being an originating party of communication between said wireless terminal and the at least one other communicating party,
to directly identify said wireless terminal to said at least one other communicating party so that said at least one other communicating party knows the current public address it has been notified of is the current public address of said wireless terminal,
wherein the wireless terminal has a private address in the wireless communication network.

15. The wireless terminal of claim 14 configured to execute said notifying by
dynamically sending an address update request substantially directly to said at least one other communicating party, the address update request comprising a source address and a destination address.

16. The wireless terminal of claim 14 configured to execute said notifying by
dynamically finding out a public address allocated to the wireless terminal at a given moment for obtaining said current public address of the wireless terminal, and
sending said current public address of the wireless terminal substantially directly to said at least one other communicating party.

17. The wireless terminal of claim 14 further configured to conditionally choose, which other communicating parties are notified of said current public address.

18. A non-transitory computer readable medium embodying a computer program executable in a wireless terminal coupled to a wireless communication network, said wireless terminal having a private address in a wireless communication network and having a varying public address dynamically allocated to it, and said wireless terminal being reachable from outside of said wireless communication network by use of said varying public address, said computer program when executed by said wireless terminal for:
dynamically notifying substantially directly at least one other communicating party of a current public address of the wireless terminal, the at least one other communicating party being an originating party of communication between said wireless terminal and the at least one other communicating party,
wherein said dynamically notifying further comprises directly identifying said wireless terminal to said at least one other communicating party so that said at least one other communicating party knows the current public address it has been notified of is the current public address of said wireless terminal.

19. A communicating party configured to receive address information for reaching another communicating party substantially directly from said another communicating party, said another communicating party being an originating communicating party of communication between said another communicating party and said communication party, wherein the communicating party is further configured
to receive an address update request from said another communicating party, and
to use a source address of the address update request as seen by said communicating party as a current public address of said another communicating party,
wherein said another communicating party has a private address in a first wireless network and a dynamically allocated varying public address, and wherein said another communicating party is reachable from outside of the first wireless communication network by use of said varying public address, wherein said address update request comprises a direct identification of said another communicating party to said communicating party so that said at least one other communicating party knows the current public address it has been notified of is the current public address of said another communicating party.

* * * * *